Jan. 12, 1954 D. G. IDLER 2,665,941
DEVICE FOR MOVING FIELD SPRINKLER SYSTEMS
Filed Jan. 14, 1952 3 Sheets-Sheet 1
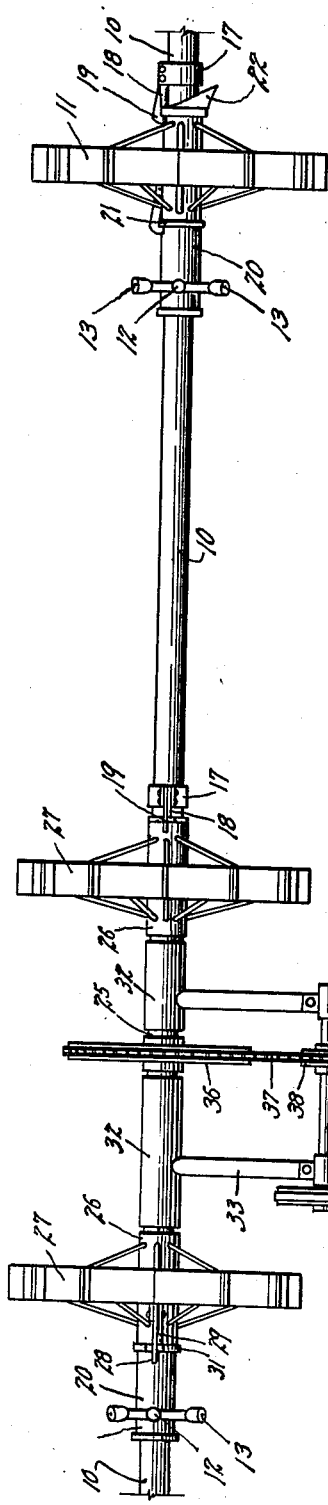
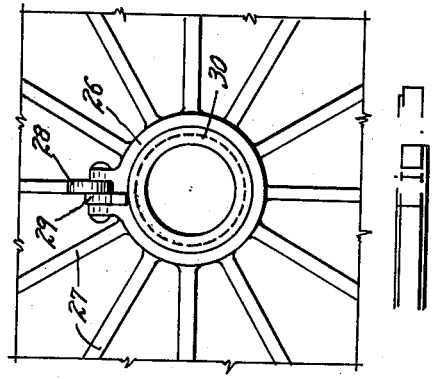
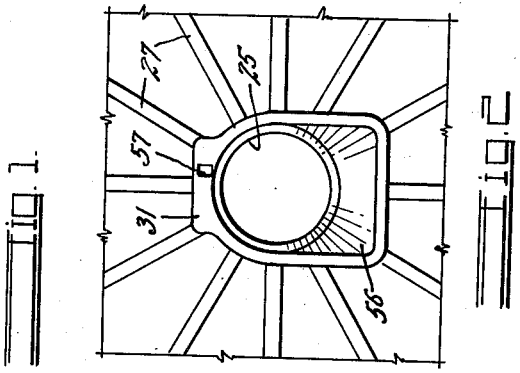
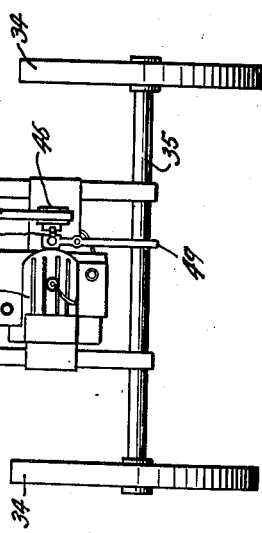
INVENTOR.
DAVID G. IDLER
BY
ATTORNEY

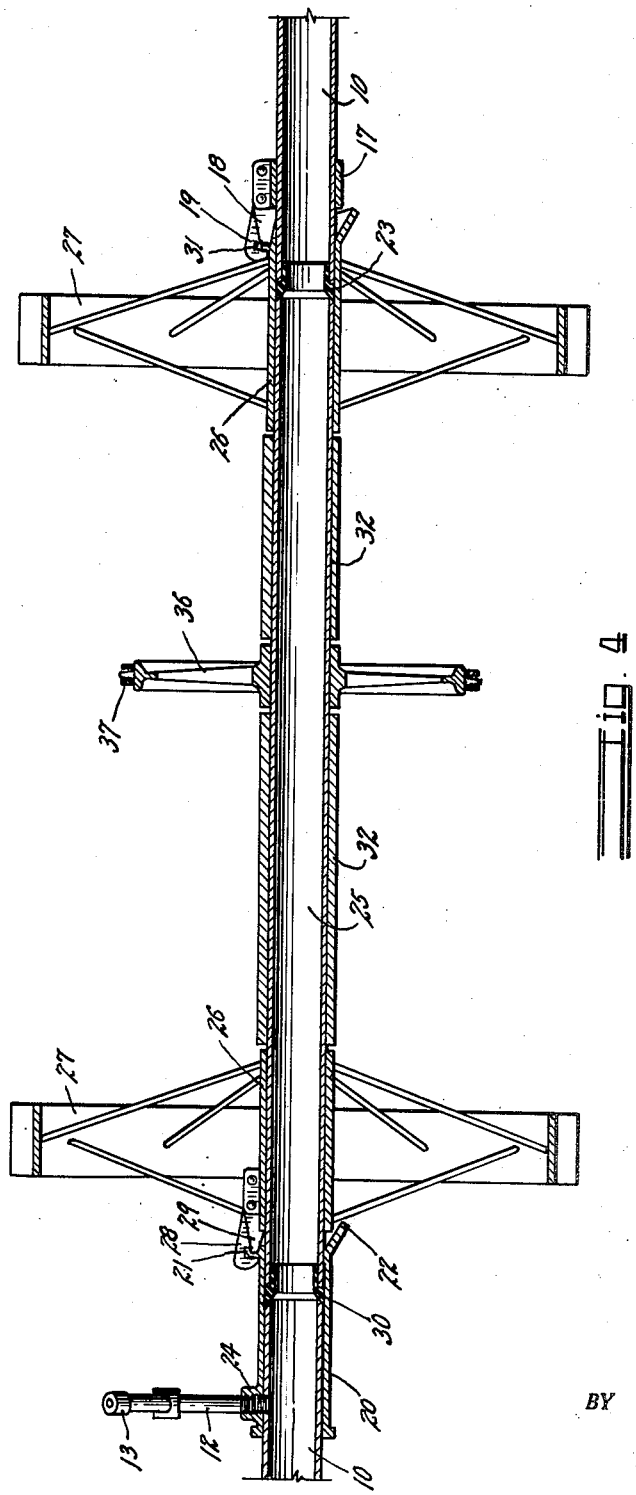

Jan. 12, 1954
D. G. IDLER
2,665,941
DEVICE FOR MOVING FIELD SPRINKLER SYSTEMS
Filed Jan. 14, 1952
3 Sheets-Sheet 3
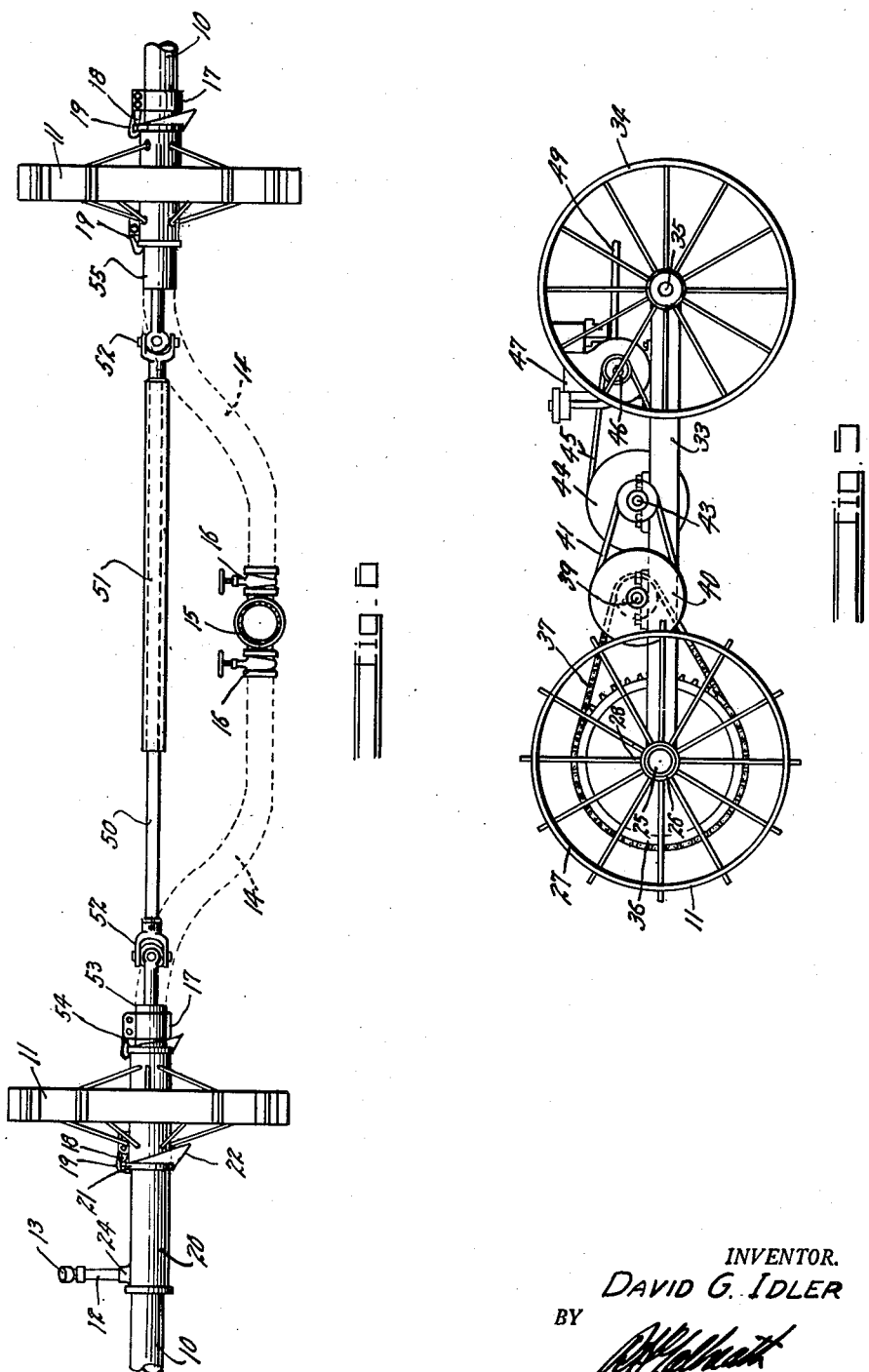
INVENTOR.
DAVID G. IDLER
BY
ATTORNEY Patented Jan. 12, 1954

2,665,941

UNITED STATES PATENT OFFICE 2,665,941

DEVICE FOR MOVING FIELD SPRINKLER SYSTEMS

David G. Idler, Kirk, Colo.

Application January 14, 1952, Serial No. 266,344

1 Claim. (Cl. 299—47)

This invention relates to a field sprinkling system of the type employing sprinkler pipe lines, and has for its principal object the provision of a highly efficient, motor-driven mechanism for easily and rapidly moving the entire sprinkling system in spaced intervals across a field so as to reduce the manual labor and time usually required for this work.

Another object of the invention is to provide motor-actuated means which can be interconnected to a plurality of spaced sprinkler pipe lines to rotate and move all of the lines simultaneously.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a plan view of the improved motor-driven mechanism, illustrating the latter connected into a typical field sprinkler pipe line;

Fig. 2 is an enlarged, fragmentary view of the left end of a rear axle employed on the improved vehicle;

Fig. 3 is a similar view of the right end of the rear axle;

Fig. 4 is an enlarged, longitudinal section through the rear axle;

Fig. 5 is a side view of the vehicle of Fig. 1; and

Fig. 6 is a side view of an interconnecting mechanism employed in the invention for connecting two adjacent, aligned sprinkler pipe lines to rotate the latter simultaneously.

Field sprinkler systems of the type to which this invention applies comprise long lines of connected lengths of sprinkler pipes, such as indicated at 10 on the drawing. The sprinkler pipes are supported above the ground at intervals upon ground-engaging wheels 11, the axles of which form couplings for the adjacent lengths of pipes. The pipes may extend the entire width of a field and may be up to three-quarters of a mile in length. The pipes are provided with sprinkler risers 12 carrying suitable nozzles 13 for spraying the water upon the plants in the field. The water is furnished to the pipe lines through flexible hoses, such as indicated in broken line at 14 in Fig. 4, from water mains 15 lying transversally of the axis of the sprinkler pipe lines. The water to the hoses 14 is controlled by any suitable valves 16.

Each pipe length is provided at one extremity with an encircling band 17 supporting a rigid, projecting locking tooth 18 and a pivoted hook 19. The other extremity of each pipe length is provided with an encircling sleeve 20 having a locking ridge 21 and a guide apron 22 at its extremity. The guide apron serves to guide the extremity of the adjacent pipe length into the sleeve 20. The locking ridge 21 is designed to be engaged by the hook 19 of the adjacent pipe length, and the ridge 21 is provided with a socket 21' for receiving the extremity of the locking tooth 18 of the adjacent extremity to prevent relative rotation of the two pipe lengths. The first extremity is provided with an annular rubber sealing gasket 23 which seals against the second pipe extremity within the sleeve 20. The sleeves are provided with coupling bosses 24 for receiving the sprinkler risers 12.

As thus far described, the device is one of the usual field sprinkler systems. This invention provides a motor-driven vehicle for moving a sprinkler pipe line consisting of a connected plurality of the pipe lengths 10, as above described, transversally by rolling the entire string of pipes and its supporting wheels 11.

The improved, motor-operated, actuating vehicle comprises a tubular axle 25 corresponding in diameter to the diameter of the pipe lengths 10. The axle is fixedly mounted at its extremities in hubs 26 of traction wheels 27. One extremity of the axle 25 is provided with a locking hook 28 and a locking tongue 29, similar to the locking hook 19 and the locking tongue 18 of a typical pipe length, as shown in Fig. 3. This extremity of the axle is also provided with a rubber sealing gasket 30 similar to the conventional sealing gaskets 23 of the pipe lengths. The opposite hub 26 of the tubular axle 25 is formed with a locking ridge 31, similar to the previously described locking ridges 21, and with a guide apron 56, similar to the guide apron 22 of a pipe length. The locking ridge is provided with a key hole 57 for receiving the rigid tooth 18 of an adjacent pipe. Thus, the extremities of two of the pipe lengths 10 can be attached to the two extremities of the tubular axle 25, similarly to the manner in which any two pipe lengths are secured together, thus connecting the tubular axle into the pipe line as a part thereof.

Two bearing sleeves 32 are rotatably mounted on the tubular axle and are attached to, and form the support for, a vehicle chassis 33 which extends transversally from the pipe line and is supported at its forward extremity on suitable supporting wheels 34 which are carried on the extremities of a fixed axle 35.

A relatively large driven sprocket 36 is fixedly mounted on the tubular axle 25 between the sleeves 32. The sprocket 36 is rotated through the medium of a transmission chain 37 from a drive sprocket 38 on a first counter-shaft 39. A belt pulley 40 is mounted on the counter-shaft 39 and driven through the medium of a first V-belt 41 from a drive pulley 42 mounted on a second counter-shaft 43. A second belt pulley 44 is mounted on the second counter-shaft 43 and driven through the medium of a second V-belt 45 from a motor pulley 46. The motor pulley 46 is rotated by means of any conventional internal combustion engine, such as indicated at 47, preferably through a clutch 48 actuated from a suitable clutch lever 49.

Let us assume that the sprinkling has been completed at one location of the pipe line. The hoses 14 are disconnected. The motor 47 is started and the clutch 48 is engaged. This causes the motor to drive the sprocket 36 through the series of transmission chains and belts above described. Since the sprocket is fixed on the tubular shaft, and since the wheels 27 are also fixed on the tubular shaft, the entire vehicle will travel at right angles to the length of sprinkler pipe.

The rotation of the wheels 27 is transmitted through the tongue 29 and the tongues 18 to the adjacent lengths of pipe 10, causing all of the wheels 11 throughout the entire length of pipe to roll parallel to the wheels 27 until a new location is reached, at which time the vehicle will be stopped, with the sprinkler risers 12 in a perpendicular position. The feed hoses 14 will now be re-connected and the sprinkling continued at the new location.

In some fields the water main 15 will lie across the center of the field, with a string of sprinkler pipes extending outwardly in both directions from the main and at right angles thereto. The feed hoses will then extend from the main in both directions, as indicated in broken line in Fig. 4.

In such fields it is unnecessary to have one of the motor vehicles for each length of pipe. The vehicle may be incorporated in one length and the rotation transmitted to the other length across the water main 15 by the mechanism shown in Fig. 4.

The connecting mechanism comprises a telescoping shaft consisting of a square inner shaft 50 slidable within a tubular square outer shaft 51. Both shafts 50 and 51 terminate in universal joints 52. One of the joints 52 terminates in a connecting member 53 carrying connecting hooks 54, similar to one extremity of a length of the pipe 10. The other universal joint 52 carries a connecting member 55 provided with a locking ridge similar to the other extremity of a length of pipe, which can be engaged by the hooks 19 of an adjacent wheel 11, or an adjacent length of pipe, thereby providing a rotative connection between the two separate lengths of pipe so that both lengths will travel simultaneously under the actuation of a single motor vehicle.

When the new location is reached, the connecting members 53 and 55 are disconnected and pulled from the adjacent pipe lengths by collapsing the telescoping shafts 50 and 51, and the feed hoses 14 are then reconnected into place.

It will be noted that the tubular axle 25 forms a component part of the pipe line, this is, the axle forms a section of the pipe and the water flows through the axle similarly to the flow through the pipe.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A vehicle for moving field sprinkler systems comprising: two spaced-apart, substantially horizontal vehicle chassis members; a fixed front axle secured to and extending transversally of the forward extremities of said chassis members; front ground-engaging wheels rotatably mounted on the extremities of said front axle to support the forward extremities of said chassis members; a horizontal bearing sleeve mounted on the rear extremity of each chassis member at right angles to the axis of the latter and in alignment with each other; a tubular rear axle rotatably mounted in said bearing sleeves and projecting oppositely outward from said chassis members; traction wheels fixedly mounted on the projecting extremities of said rear axle; means on each extremity of said rear axle for connecting the latter to a length of sprinkler pipe; a drive sprocket fixedly mounted on said rear axle intermediate said bearing sleeves; an engine supported by said chassis members; power transmission means transmitting power from said engine to said drive sprocket for rotating said rear axle and, through it, said drive wheels; a first length of sprinkler pipe detachably affixed to one extremity of said rear axle; a second length of sprinkler pipe aligned with the first length; a telescoping connecting shaft extending between the adjacent extremities of said pipe lengths; and universal joint means connecting the extremities of said shaft to the adjacent extremities of said pipe lengths so that the rotative effort of said rear axle will be transmitted through said first pipe length to said second pipe length.

DAVID G. IDLER.

References Cited in the file of this patent

UNITED STATES PATENTS

| Number | Name | Date |
| --- | --- | --- |
| 618,037 | Johnson | Jan. 17, 1899 |
| 679,045 | Benson | July 23, 1901 |
| 1,085,609 | Heath | Feb. 3, 1914 |
| 1,966,783 | Balaam | July 17, 1934 |
| 2,582,416 | Cornelius | Jan. 15, 1952 |
| 2,595,495 | Stratman | May 6, 1952 |
| 2,604,359 | Zybach | July 22, 1952 |